(12) United States Patent
Moorlag et al.

(10) Patent No.: US 8,877,846 B2
(45) Date of Patent: *Nov. 4, 2014

(54) SURFACE COATING AND FUSER MEMBER

(75) Inventors: Carolyn P. Moorlag, Mississauga (CA); Suxia Yang, Mississauga (CA); Yu Qi, Oakville (CA); Qi Zhang, Milton (CA); Brynn M. Dooley, Toronto (CA); Sandra J. Gardner, Oakville (CA)

(73) Assignee: Xerox Corporation, Norwalk, CT (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/448,808

(22) Filed: Apr. 17, 2012

(65) Prior Publication Data

US 2013/0274376 A1    Oct. 17, 2013

(51) Int. Cl.
*C08K 3/22* (2006.01)

(52) U.S. Cl.
USPC ............... 524/413; 427/421.1; 427/427.4; 524/430; 524/492

(58) Field of Classification Search
CPC .......... C08K 7/22; C08K 7/26; C09D 7/1216; C09D 7/1291; C09D 127/12; C09D 127/18; B01F 11/02; B01F 3/18; B05D 1/12; B05D 3/0254; G03G 15/2057
USPC ............. 524/413, 430, 492; 427/421.1, 427.4
See application file for complete search history.

(56) References Cited

U.S. PATENT DOCUMENTS

| | | | |
|---|---|---|---|
| 4,451,634 A | 5/1984 | Hatanaka et al. | |
| 4,711,818 A | 12/1987 | Henry | |
| 5,363,180 A | 11/1994 | Shimizu et al. | |
| 5,666,592 A | 9/1997 | Aslam et al. | |
| 5,709,973 A | 1/1998 | Chen et al. | |
| 5,716,750 A | 2/1998 | Tyagi et al. | |
| 5,729,813 A | 3/1998 | Eddy et al. | |
| 5,887,235 A | 3/1999 | Wayman et al. | |
| 6,087,729 A | 7/2000 | Cerofolini et al. | |
| 6,101,345 A | 8/2000 | Van Goethem et al. | |
| 6,113,830 A | 9/2000 | Chen et al. | |
| 6,438,336 B1 | 8/2002 | Bengtson | |
| 6,927,006 B2 | 8/2005 | Finn et al. | |
| 6,983,119 B2 | 1/2006 | Nakayama | |
| 7,088,946 B2 | 8/2006 | Behnke et al. | |
| 7,395,021 B2 | 7/2008 | Tamura et al. | |
| 7,754,121 B2 | 7/2010 | Ristic-Lehmann et al. | |
| 8,029,871 B2 | 10/2011 | Nakayama et al. | |
| 8,647,712 B2 * | 2/2014 | Moorlag et al. | .......... 427/180 |
| 8,735,324 B2 | 5/2014 | Jentzer et al. | |
| 2001/0034158 A1 | 10/2001 | Matsubara | |
| 2003/0207078 A1 | 11/2003 | Finn et al. | |
| 2004/0034158 A1 | 2/2004 | Reuter et al. | |
| 2005/0100728 A1 | 5/2005 | Ristic-Lehmann et al. | |
| 2007/0231615 A1 | 10/2007 | Tsujimoto et al. | |
| 2008/0070041 A1 | 3/2008 | Kuntz et al. | |
| 2008/0241415 A1 | 10/2008 | Stelter et al. | |
| 2008/0311398 A1 | 12/2008 | Bauer et al. | |
| 2009/0247648 A1 | 10/2009 | Zhao | |
| 2010/0226701 A1 | 9/2010 | Moorlag | |
| 2012/0244469 A1 | 9/2012 | Zwartz et al. | |

OTHER PUBLICATIONS

U.S. Appl. No. 13/251,364, filed Oct. 3, 2011.
U.S. Appl. No. 13/182,015, filed Jul. 13, 2011.
U.S. Appl. No. 13/053,730, filed Mar. 22, 2011.
U.S. Appl. No. 13/053,423, filed Mar. 22, 2011.
U.S. Appl. No. 13/053,418, filed Mar. 22, 2011.
U.S. Appl. No. 13/288,494, filed Nov. 3, 2011.
Buie-Hatcher, Final Office Action, U.S. Appl. No. 13/053,418, Sep. 19, 2012.
U.S. Appl. No. 13/053,418, filed Mar. 22, 2011, Office Action dated Apr. 17, 2012.
"Dow Corning VM-2270 Aerogel Fine Particles" Dow Corning Corporation 2008.
U.S. Appl. No. 13/053,423, Office Action dated Feb. 22, 2013.
U.S. Appl. No. 13/053,418, Notice of Allowance and Fees Due dated Dec. 28, 2012.
U.S. Appl. No. 13/251,364, Office Action dated Apr. 11, 2013.
U.S. Appl. No. 13/288,494, Ex Parte Quayle dated Apr. 17, 2013.
U.S. Appl. No. 13/448,822, Office Action dated Jun. 7, 2013.
Roberts, "Resonant Acoustic Mixing", Resodyn Acoustic Mixers, Nov. 6, 2011, pp. 1-8.
"Spectral Series Fumed Alumina for Power Coating Processes", Cabot Corporation, MA, USA, 2005, pp. 1-2.
U.S. Appl. No. 13/053,423, Office Action dated Jun. 17, 2013.

* cited by examiner

*Primary Examiner* — Edward Cain
(74) *Attorney, Agent, or Firm* — Hoffman Warnick LLC (57) ABSTRACT

The present teachings disclose a surface coating composition. The surface coating composition includes fluorine containing particles, aerogel particles and positive tribocharging particles. The surface coating is useful as the release layer for fuser members.

20 Claims, 5 Drawing Sheets

SURFACE COATING AND FUSER MEMBER

CROSS REFERENCE TO RELATED APPLICATIONS

This application relates to commonly assigned copending application Ser. No. 13/448,822, filed simultaneously herewith and incorporated by reference herein in its entirety.

BACKGROUND

1. Field of Use

This disclosure is generally directed to surface layers having a low surface energy and specifically to fuser members useful in electrophotographic imaging apparatuses, including digital, image on image, and the like.

2. Background

Very low surface-energy coatings are required in many industries for a broad range of applications, including non-stick cookery, anti-fouling of marine contaminants, self-cleaning windows and architectural materials, machinery coatings, mold release packaging, ink and toner packaging, anti-graffiti components, ink-jet printing and oil-less printing. Very low surface-energy coatings are required for oil-less printing. Fillers have been added to low surface energy fluoroplastic materials such as perfluoroalkoxy polymer resin (PFA) to modify the surface properties; however non-fluorinated material fillers often result in poor release performance. It would be desirable to have a filler material that improves surface properties of fuser topcoats.

In the electrophotographic printing process, a toner image can be fixed or fused upon a support (e.g., a paper sheet) using a fuser roller. Conventional fusing technologies apply release agents/fuser oils to the fuser roller during the fusing operation, in order to maintain good release properties of the fuser roller. For example, oil fusing technologies have been used for all high speed products in the entry production and production color market.

A coating having a low surface energy that is durable and easily manufactured is desirable. In addition, a coating having an even distribution of texture forming particles that enables transfer of toner to form films of variable gloss is desirable.

SUMMARY

According to an embodiment, there is disclosed a coating composition comprising fluorine containing particles, aerogel particles and positive tribocharging particles.

According to another embodiment, there is provided a method of making a fuser member. The method includes obtaining a fuser member comprising a resilient layer disposed on a substrate. The method includes spray coating a powder comprising a composition of fluorine containing particles, aerogel particles and positive tribocharging particles on the resilient layer to form a coated layer. The coated layer is heated to a temperature of from about 260° C. to about 380° C. to cure the fluorine containing particles to form a release layer.

According to another embodiment, there is provided a fuser member comprising a substrate and an outer layer disposed on the substrate. The outer layer comprises a fluorine containing polymer matrix having dispersed therein aerogel particles, wherein the aerogel particles, comprise from about 0.1 weight percent to about 10 weight percent of the outer layer, and positive fumed alumina particles wherein the positive fumed alumina particles comprise from 0.1 weight percent to about 5 weight percent of the outer layer. The fuser member has a G75 surface gloss ranging from about 5 ggu to about 70 ggu.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such a feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

As used herein, the term "hydrophobic/hydrophobicity" and the term "oleophobic/oleophobicity" refer to the wettability behavior of a surface that has, e.g., a water and hexadecane (or hydrocarbons, silicone oils, etc.) contact angle of approximately 90° or more, respectively. For example, on a hydrophobic/oleophobic surface, a ~10-15 µL water/hexadecane drop can bead up and have an equilibrium contact angle of approximately 90° or greater.

As used herein, the term "ultrahydrophobicity/ultrahydrophobic surface" and the term "ultraoleophobic/ultraoleophobicity" refer to wettability of a surface that has a more restrictive type of hydrophobicity and oleophobicity, respectively. For example, the ultrahydrophobic/ultraoleophobic surface can have a water/hexadecane contact angle of about 120° or greater.

The term "superhydrophobicity/superhydrophobic surface" and the term "superoleophobic/superoleophobicity" refer to wettability of a surface that has an even more restrictive type of hydrophobicity and oleophobicity, respectively. For example, a superhydrophobic/superoleophobic surface can have a water/hexadecane contact angle of approximately 150 degrees or greater and have a ~10-15 µL water/hexadecane drop roll freely on the surface tilted a few degrees from level. The sliding angle of the water/hexadecane drop on a superhydrophobic/superoleophobic surface can be about 10 degrees or less. On a tilted superhydrophobic/superoleophobic surface, since the contact angle of the receding surface is high and since the interface tendency of the uphill side of the drop to stick to the solid surface is low, gravity can overcome the resistance of the drop to slide on the surface. A superhydrophobic/superoleophobic surface can be described as having a very low hysteresis between advancing and receding contact angles (e.g., 40 degrees or less). Note that larger drops can be more affected by gravity and can tend to slide easier, whereas smaller drops can tend to be more likely to remain stationary or in place.

As used herein, the term "low surface energy" and the term "very low surface energy" refer to the ability of molecules to adhere to a surface. The lower the surface energy, the less likely a molecule will adhere to the surface. For example, the low surface energy is characterized by a value of about 20 mN/m$^2$ or less, a very low surface energy is characterized by a value of about 10 mN/m$^2$ or less.

The fixing or fuser member can include a substrate having one or more functional layers formed thereon. The one or more functional layers includes a surface coating or top layer having a surface wettability that is hydrophobic and/or oleophobic; ultrahydrophobic and/or ultraoleophobic; or superhydrophobic and/or superoleophobic. Such a fixing member can be used as an oil-less fusing member for high speed, high quality electrophotographic printing to ensure and maintain a good toner release from the fused toner image on the supporting material (e.g., a paper sheet), and further assist paper stripping.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 1:
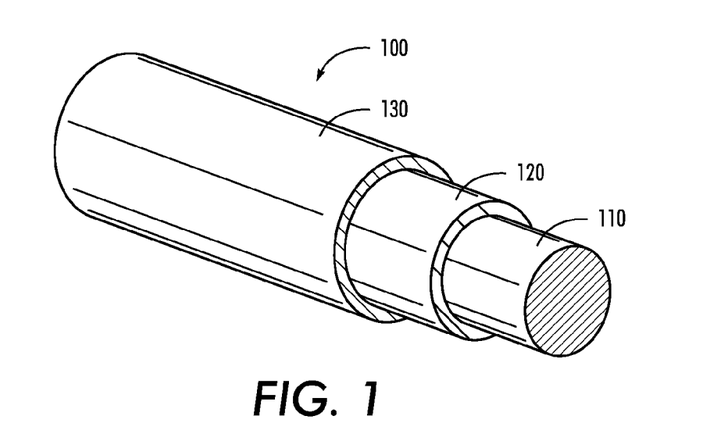
FIG. 1 depicts an exemplary fusing member having a cylindrical substrate in accordance with the present teachings.
Figure 2:
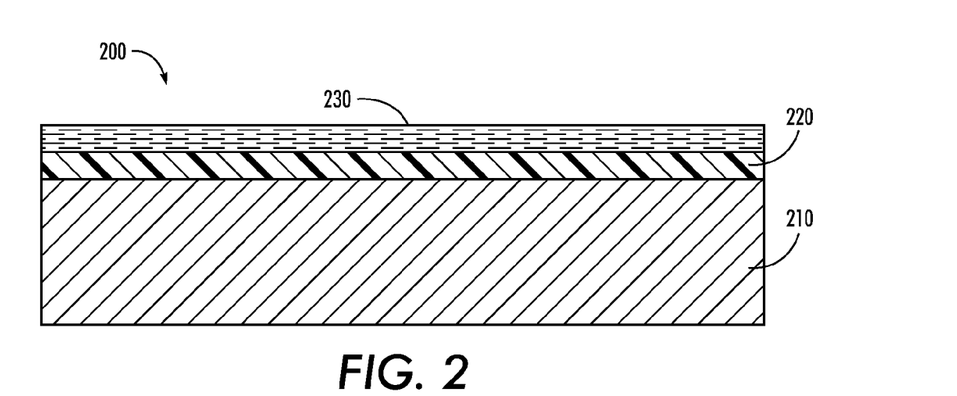
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 (also referred to as intermediate layers) and an outer layer 130 formed thereon. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The belt substrate 210 and the cylindrical substrate 110 can be formed from, for example, polymeric materials (e.g., polyimide, polyaramide, polyether ether ketone, polyetherimide, polyphthalamide, polyamideimide, polyketone, polyphenylene sulfide, fluoropolyimides or fluoropolyurethanes) and metal materials (e.g., aluminum or stainless steel) to maintain rigidity and structural integrity as known to one of ordinary skill in the art.

Substrate Layer

The substrate layer 110, 210 in FIGS. 1 and 2 can be in a form of, for example, a belt, plate, and/or cylindrical drum for the disclosed fuser member. The substrate of the fusing member is not limited, as long as it can provide high strength and physical properties that do not degrade at a fusing temperature. Specifically, the substrate can be made from a metal, such as aluminum or stainless steel or a plastic of a heat-resistant resin. Examples of the heat-resistant resin include a polyimide, an aromatic polyimide, polyether imide, polyphthalamide, polyester, and a liquid crystal material such as a thermotropic liquid crystal polymer and the like. The thickness of the substrate falls within a range where rigidity and flexibility enabling the fusing belt to be repeatedly turned can be compatibly established, for instance, ranging from about 10 micrometers to about 200 micrometers or from about 30 micrometers to about 100 micrometers.

Functional Layer

Examples of functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of functional layers 120 and 220 also include fluoroelastomers. Fluoroelastomers are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the tecnoflons identified as FOR-60KIR®, FOR-LHF®, NM® FOR-THF®, FOR-TFS® TH® NH® P757® TNS® T439® PL958® BR9151® and TN505 available from Ausimont.

The fluoroelastomers VITON GH® and VITON GF® have relatively low amounts of vinylidenefluoride. The VITON GF and VITON GH have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the functional layer can be from about 0.5 mm to about 10 mm, or from about 1 mm to about 8 mm, or from about 2 mm to about 7 mm. For a belt configuration, the functional layer can be from about 25 microns up to about 2 mm, or from 40 microns to about 1.5 mm, or from 50 microns to about 1 mm.

Adhesive Layer(s)

Optionally, any known and available suitable adhesive layer, also referred to as a primer layer, may be positioned between the release layer 130, 130, the intermediate layer 120, 220 and the substrate 110, 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. Optionally, any known and available suitable adhesive layer may be positioned between the release layer or outer surface, the functional layer and the substrate. The adhesive layer can be coated on the substrate, or on the functional layer, to a thickness of from about 2 nanometers to about 10,000 nanometers, or from about 2 nanometers to about 1,000 nanometers, or from about 2 nanometers to about 5000 nanometers. The adhesive can be coated by any suitable known technique, including spray coating or wiping.

Release Layer

Fluoroplastic coatings that include aerogel particles into the topcoat matrix have been used to obtain low gloss images in fuser members. U.S. Ser. No. 13/053,418, incorporated in its entirety herein, describes such release layers. However, processing of powder fluoroplastic/aerogel mixtures remains a challenge. Powder coating is a desirable processing method for fuser coatings; however, fluoroplastic and aerogel powders have a tendency to separate during powder coating processing resulting in incomplete curing and non-homogeneous release layers. It is desirable to find homogeneous powder mixture while powder coating that promotes cohesion of the cured topcoat.

Fluoroplastic and aerogel powders are two dissimilar powders that must be coated and cured together to form a fusing topcoat suitable to prepare low gloss prints. The addition of a tribocharging powder of opposite charge (positive) to the component powders (negative) results in an association forming between powders which results in a homogenous mixture throughout the powder coating process. Positive tribocharging powders mixed with fluoroplastic powders and aerogel particles enhance wetting while curing to yield cohesive coatings for low gloss fusing applications.

An exemplary embodiment of a release layer 130 or 230 includes fluoroplastics having aeorgel particles and positive tribocharging particles dispersed therein. Examples of fluoroplastics include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer, and mixtures thereof. The fluoroplastics provide chemical and thermal stability and have a low surface energy. The fluoroplastics have a melting temperature of from about 255° C. to about 360° C. or from about 280° C. to about 330° C.

For the fuser member 200, the thickness of the outer surface layer or release layer 230 can be from about 10 microns to about 100 microns, or from about 20 microns to about 80 microns, or from about 30 microns to about 50 microns.

Additives and additional conductive or non-conductive fillers may be present in the intermediate layer substrate layers 110 and 210, the intermediate layers 120 and 220 and the release layers 130 and 230. In various embodiments, other filler materials or additives including, for example, inorganic particles, can be used for the coating composition and the subsequently formed surface layer. Conductive fillers used herein may include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Figure 3A:
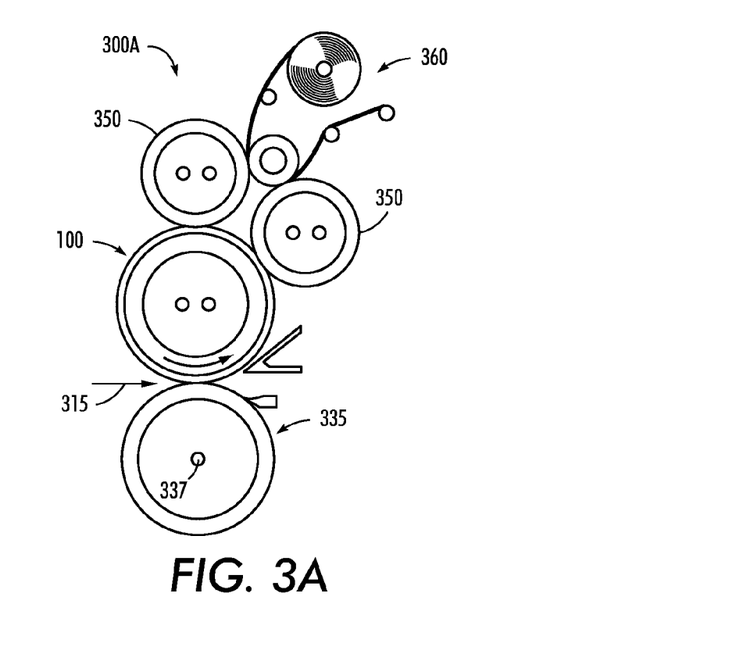
FIGS. 3A-3B depict exemplary fusing configurations using the fuser rollers shown in FIG. 1 in accordance with the present teachings.
Figure 3B:
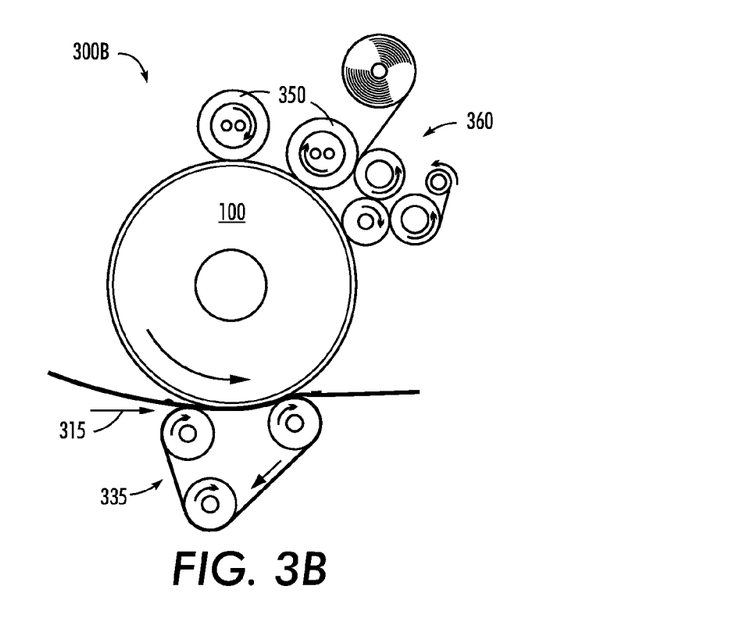
Figure 4A:
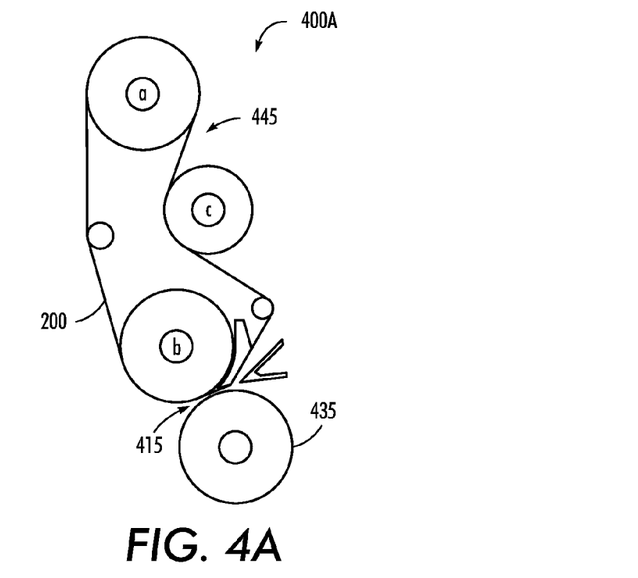
FIGS. 4A-4B depict another exemplary fusing configurations using the fuser belt shown in FIG. 2 in accordance with the present teachings.
Figure 4B:
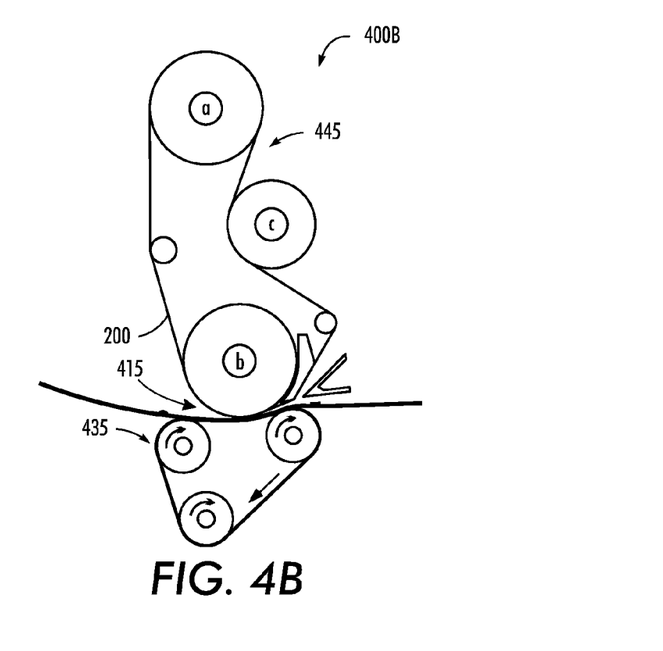

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
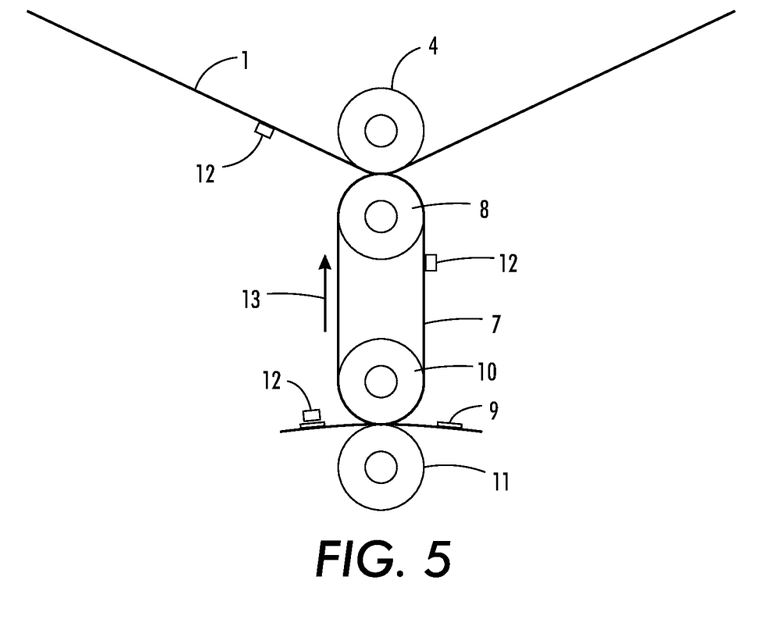
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

A composite surface coating that improves surface properties including superhydrophobicity is described. The fluoroplastics listed earlier (e.g. PFA Teflon, PTFE Teflon, FEP, etc) exhibit excellent properties for a fuser top coat; however, it would be desirable to increase the hydrophobicity and lower the brittleness of such top coats.

Aerogel/fluoroplastic composite coatings produce a superhydrophobic surface capable of very low surface energy. The addition of aerogel to a fluoroplastic coating increases the modulus, and allows the opportunity to modify the materials' properties without increasing the surface energy (such as would be the case with the addition of carbon black or other hard filler particles).

Low gloss prints have been obtained using fluoroplastic and silica aerogel fusing topcoat layers on fuser rolls. The use of low gloss fusing members (rolls or belts) to change print gloss has advantages over low gloss toner by enabling a fast changeover time, as well as extending the gloss range that can be obtained. Fluoroplastic/aerogel fuser coatings used to obtain lower gloss prints have been demonstrated via spray coating from solvent dispersions and melt-curing the top layer. However, the spray coating process results in high variance between samples, due to particle settling. A desirable processing method for production coating of fusing members is powder coating.

Powder coating is a coating process involving the application of a free flowing, dry powder to a surface, followed by curing. The powder is electrostatically charged, and then directed to a grounded component to form the coating layer. With the application of heat, the powder will melt and flow to form the cured coating. Powder coating mixtures of two powders such as PFA and aerogel is challenging due to dissimilar densities and flow behavior of the powders, leading to inhomogeneous powder mixtures, and changing concentrations of aerogels on coated components.

Curing of mixed fluoroplastic/aerogel coatings is additionally problematic due to inefficient wetting between dissimilar particles upon melting of fluoroplastic, leading to lack of cohesion of the cured surface. Cured topcoats of powder coated fluoroplastic particles and aerogel particles showed a loss of aerogel occurring during powder coating (more should be present on the surface) and poor wetting between the fluoroplastic and aerogel particles resulting in large voids and inclusions. An extra processing step, such as washing of the particles with the addition of surface functionalities, can improve wetting and curing; however, this step promotes little to no association between particles during powder coating. Additionally, it is desirable to avoid the incorporation of extra steps for production coating. Disclosed herein is a materials system that enables a homogeneous powder mixture while powder coating and promote cohesion of the cured topcoat.

Figure 6:
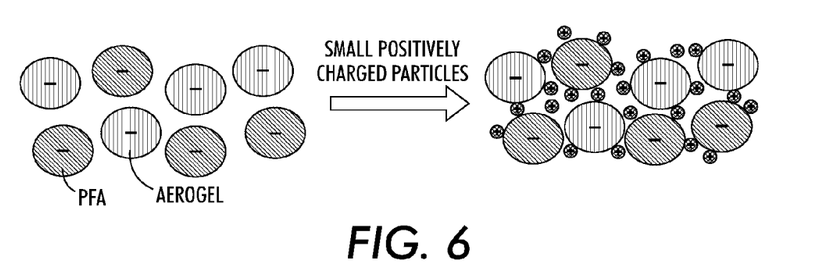
FIG. 6 is a representation of the association of fluoroplastic and aerogel particles with the addition of positive tribocharging powder.

The addition of positive tribocharging particles to powder mixtures of fluoroplastic such as PFA, and aerogels such as silica aerogel, enables powder coating processing. Fluoroplastics carry a partial negative charge, as do aerogel particles. Submicron-sized, positively charged, tribocharging particles associate with both PFA and silica aerogel particles, acting an associating component between particles, and enabling the two-component mixture to behave as a single powder. FIG. 6 shows a representation of positive tribocharging particles acting as associating particles in the composite powder mixture. In FIG. 6 the larger circles represent the fluoroplastic particles and the aerogel particles. The smaller circles represent the tribocharging particles and are attracted to the outer surfaces of the fluoroplastic particles and the aerogel particles.

The consequences of powder association during the powder coating process are both the formation of a homogeneous mixture, and the maintenance of the desired aerogel ratio while coating, without loss of low-density aerogel particles during mixing. Association between powders also aids in the wetting of melted fluoroplastic particles with aerogel particles to yield cohesive coatings that are free of voids and suitable to be used for low gloss fusing applications.

A suitable tribocharging agent is fumed alumina. The fumed alumina can have a surface area of from about 30 m$^2$/g to about 400 m²/g, or from about 50 m²/g to about 300 m²/g, or from about 100 m²/g to 200 m²/g The amount of positive tribocharging particles in the powder coating ranges from about 0.1 weight percent to about 5 weight percent, or from about 0.2 weight percent to about 3.0 weight percent, or from about 0.5 weight percent to about 1.5 weight percent of the total solids in the powder. Positive tribocharging particles are approximately 5 nm to 1 micron in size, or 10 nm to 500 nm, or 20 nm to 100 nm.

Suitable positive tribocharging particles may be formed from silica, zirconia, germania, or other positive metal oxide materials. Metal oxide tribocharging particles may be formed from fumed metal oxides, precipitated metal oxides, or from a gel.

Positive tribocharging particles used may be treated with a hydrophobic agent to render the particles hydrophobic. Hydrophobic agents used may include organosilane, organosiloxane, polyorganosiloxane, organosilazane, or polyorganosilazanes.

Positive tribocharging particles used may be treated with surface agents to enhance tribocharging behavior.

Aerogels may be described, in general terms, as gels that have been dried to a solid phase by removing pore fluid and replacing the pore fluid with air. As used herein, an "aerogel" refers to a material that is generally a very low density ceramic solid, typically formed from a gel. The term "aerogel" is thus used to indicate gels that have been dried so that the gel shrinks little during drying, preserving its porosity and related characteristics. In contrast, "hydrogel" is used to describe wet gels in which pore fluids are aqueous fluids. The term "pore fluid" describes fluid contained within pore structures during formation of the pore element(s). Upon drying, such as by supercritical drying, aerogel particles are formed that contain a significant amount of air, resulting in a low density solid and a high surface area. In various embodiments, aerogels are thus low-density microcellular materials characterized by low mass densities, large specific surface areas and very high porosities. In particular, aerogels are characterized by their unique structures that comprise a large number of small interconnected pores. After the solvent is removed, the polymerized material is pyrolyzed in an inert atmosphere to form the aerogel.

Any suitable aerogel component can be used. In embodiments, the aerogel component can be, for example, selected from inorganic aerogels, organic aerogels, carbon aerogels, and mixtures thereof. In particular embodiments, ceramic aerogels can be suitably used. These aerogels are typically composed of silica, but may also be composed of metal oxides, such as alumina, titania and zirconia, or carbon, and can optionally be doped with other elements such as a metal. In some embodiments, the aerogel component can comprise aerogels chosen from polymeric aerogels, colloidal aerogels, and mixtures thereof.

The aerogel component can be either formed initially as the desired sized particles, or can be formed as larger particles and then reduced in size to the desired size. For example, formed aerogel materials can be ground, or they can be directly formed as nano to micron sized aerogel particles.

Aerogel particles of embodiments may have porosities of from about 50 percent to about 99.9 percent, in which the aerogel can contain 99.9 percent empty space. In embodiments the aerogel particles have porosities of from about 50 percent to about 99.0 percent, or from 50 percent to about 98 percent. In embodiments, the pores of aerogel components may have diameters of from about 2 nm to about 500 nm, or from about 10 nm to about 400 nm or from about 20 nm to about 100 nm. In particular embodiments, aerogel components may have porosities of more than 50 percent pores with diameters of less than 100 nm and even less than about 20 nm. In embodiments, the aerogel components may be in the form of particles having a shape that is spherical, or near-spherical, cylindrical, rod-like, bead-like, cubic, platelet-like, and the like.

In embodiments, the aerogel components include aerogel particles, powders, or dispersions ranging in average volume particle size of from about 1 μm to about 100 μm, or about 3 μm to about 50 μm, or about 5 μm to 20 μm. The aerogel components can include aerogel particles that appear as well dispersed single particles or as agglomerates of more than one particle or groups of particles within the polymer material.

Generally, the type, porosity, pore size, and amount of aerogel used for a particular embodiment may be chosen based upon the desired properties of the resultant composition and upon the properties of the polymers and solutions thereof into which the aerogel is being combined. For example, if a pre-polymer (such as a low molecular weight polyurethane monomer that has a relatively low process viscosity, for example less than 10 centistokes) is chosen for use in an embodiment, then a high porosity, for example greater than 80%, and high specific surface area, for example greater than about 500 m²/gm, aerogel having relatively small pore size, for example less than about 100 nm, may be mixed at relatively high concentrations, for example greater than about 2 weight percent to about 20 weight percent, into the pre-polymer by use of moderate-to-high energy mixing techniques, for example by controlled temperature, high shear and/or blending. If a hydrophilic-type aerogel is used, upon cross-linking and curing/post curing the pre-polymer to form an infinitely long matrix of polymer and aerogel filler, the resultant composite may exhibit improved hydrophobicity and increased hardness when compared to a similarly prepared sample of unfilled polymer. The improved hydrophobicity may be derived from the polymer and aerogel interacting during the liquid-phase processing whereby, a portion of the molecular chain of the polymer interpenetrates into the pores of the aerogel and the non-pore regions of the aerogel serve to occupy some or all of the intermolecular space where water molecules could otherwise enter and occupy.

The continuous and monolithic structure of interconnecting pores that characterizes aerogel components also leads to high surface areas and, depending upon the material used to make the aerogel, the electrical conductivity may range from highly thermally and electrically conducting to highly thermally and electrically insulating. Further, aerogel components in embodiments may have surface areas ranging from about 400 m²/g to about 1200 m²/g, such as from about 500 m²/g to about 1200 m²/g, or from about 700 m²/g to about 900 m²/g. In embodiments, aerogel components may have electrical resistivities greater than about $1.0 \times 10^{-4}$ Ω-cm, such as in a range of from about 0.01 Ω-cm to about $1.0 \times 10^{16}$ Ω-cm, from about 1 Ω-cm to about $1.0 \times 10^{8}$ Ω-cm, or from about 50 Ω-cm to about 750,000 Ω-cm. Different types of aerogels used in various embodiments may also have electrical resistivities that span from conductive, about 0.01 Ω-cm to about 1.00 Ω-cm, to insulating, more than about $10^{16}$ Ω-cm. Conductive aerogels of embodiments, such as carbon aerogels, may be combined with other conductive fillers to produce combinations of physical, mechanical, and electrical properties that are otherwise difficult to obtain.

Aerogels that can suitably be used in embodiments may be divided into three major categories: inorganic aerogels, organic aerogels and carbon aerogels. In embodiments, the fuser member layer may contain one or more aerogels chosen from inorganic aerogels, organic aerogels, carbon aerogels and mixtures thereof. For example, embodiments can include multiple aerogels of the same type, such as combinations of two or more inorganic aerogels, combinations of two or more organic aerogels, or combinations of two or more carbon aerogels, or can include multiple aerogels of different types, such as one or more inorganic aerogels, one or more organic aerogels, and/or one or more carbon aerogels. For example, a chemically modified, hydrophobic silica aerogel may be combined with a high electrical conductivity carbon aerogel to simultaneously modify the hydrophobic and electrical properties of a composite and achieve a desired target level of each property.

Inorganic aerogels, such as silica aerogels, are generally formed by sol-gel polycondensation of metal oxides to form highly cross-linked, transparent hydrogels. These hydrogels are subjected to supercritical drying to form inorganic aerogels.

Organic aerogels are generally formed by sol-gel polycondensation of resorcinol and formaldehyde. These hydrogels are subjected to supercritical drying to form organic aerogels.

Carbon aerogels are generally formed by pyrolyzing organic aerogels in an inert atmosphere. Carbon aerogels are composed of covalently bonded, nanometer-sized particles that are arranged in a three-dimensional network. Carbon aerogels, unlike high surface area carbon powders, have oxygen-free surfaces, which can be chemically modified to increase their compatibility with polymer matrices. In addition, carbon aerogels are generally electrically conductive, having electrical resistivities of from about 0.005 $\Omega$-cm to about 1.00 $\Omega$-cm. In particular embodiments, the composite may contain one or more carbon aerogels and/or blends of one or more carbon aerogels with one or more inorganic and/or organic aerogels.

Carbon aerogels that may be included in embodiments exhibit two morphological types, polymeric and colloidal, which have distinct characteristics. The morphological type of a carbon aerogel depends on the details of the aerogel's preparation, but both types result from the kinetic aggregation of molecular clusters. That is, nanopores, primary particles of carbon aerogels that may be less than 20 Å (Angstroms) and that are composed of intertwined nanocrystalline graphitic ribbons, cluster to form secondary particles, or mesopores, which may be from about 20 Å to about 500 Å. These mesopores can form chains to create a porous carbon aerogel matrix. The carbon aerogel matrix may be dispersed, in embodiments, into polymeric matrices by, for example, suitable melt blending or solvent mixing techniques.

In embodiments, carbon aerogels may be combined with, coated, or doped with a metal to improve conductivity, magnetic susceptibility, and/or dispersibility. Metal-doped carbon aerogels may be used in embodiments alone or in blends with other carbon aerogels and/or inorganic or organic aerogels. Any suitable metal, or mixture of metals, metal oxides and alloys may be included in embodiments in which metal-doped carbon aerogels are used. In particular embodiments, and in specific embodiments, the carbon aerogels may doped with one or more metals chosen from transition metals (as defined by the Periodic Table of the Elements) and aluminum, zinc, gallium, germanium, cadmium, indium, tin, mercury, thallium and lead. In particular embodiments, carbon aerogels are doped with copper, nickel, tin, lead, silver, gold, zinc, iron, chromium, manganese, tungsten, aluminum, platinum, palladium, and/or ruthenium. For example, in embodiments, copper-doped carbon aerogels, ruthenium-doped carbon aerogels and mixtures thereof may be included in the composite.

For example, as noted earlier, in embodiments in which the aerogel components comprise nanometer-scale particles, these particles or portions thereof can occupy inter- and intra-molecular spaces within the molecular lattice structure of the polymer, and thus can prevent water molecules from becoming incorporated into those molecular-scale spaces. Such blocking may decrease the hydrophilicity of the overall composite. In addition, many aerogels are hydrophobic. Incorporation of hydrophobic aerogel components may also decrease the hydrophilicity of the composites of embodiments. Composites having decreased hydrophilicity, and any components formed from such composites, have improved environmental stability, particularly under conditions of cycling between low and high humidity.

The aerogel particles can include surface functionalities selected from the group of alkylsilane, alkylchlorosilane, alkylsiloxane, polydimethylsiloxane, aminosilane and methacrylsilane. In embodiments, the surface treatment material that contains functionality reactive to aerogel that result in modified surface interactions. Surface treatment also helps enable non-stick interaction on the composition surface.

In addition, the porous aerogel particles may interpenetrate or intertwine with the fluoroplastic and thereby strengthen the polymeric lattice. The mechanical properties of the overall composite of embodiments in which aerogel particles have interpenetrated or interspersed with the polymeric lattice may thus be enhanced and stabilized.

For example, in one embodiment, the aerogel component can be a silica silicate having an average particle size of 5-15 microns, a porosity of 90% or more, a bulk density of 40-100 kg/m$^3$, and a surface area of 600-800 m$^2$/g. Of course, materials having one or more properties outside of these ranges can be used, as desired.

Depending upon the properties of the aerogel components, the aerogel components can be used as is, or they can be chemically modified. For example, aerogel surface chemistries may be modified for various applications, for example, the aerogel surface may be modified by chemical substitution upon or within the molecular structure of the aerogel to have hydrophilic or hydrophobic properties. For example, chemical modification may be desired so as to improve the hydrophobicity of the aerogel components. When such chemical treatment is desired, any conventional chemical treatment well known in the art can be used. For example, such chemical treatments of aerogel powders can include replacing surface hydroxyl groups with organic or partially fluorinated organic groups, or the like.

In general, a wide range of aerogel components are known in the art and have been applied in a variety of uses. For example, many aerogel components, including ground hydrophobic aerogel particles, have been used as low cost additives in such formulations as hair, skincare, and antiperspirant compositions. One specific non-limiting example is the commercially available powder that has already been chemically treated, Dow Corning VM-2270 Aerogel fine particles having a size of about 5-15 microns.

In embodiments, the surface coating may comprise at least the above-described aerogel that is at least one of dispersed in or bonded to the fluoroplastic component. In particular embodiments, the aerogel is uniformly dispersed in and/or bonded to the fluoroplastic component, although non-uniform dispersion or bonding can be used in embodiments to achieve specific goals. For example, in embodiments, the aerogel can be non-uniformly dispersed or bonded in the fluoroplastic component to provide a high concentration of the aerogel in surface layers, substrate layers, different portions of a single layer, or the like.

Any suitable amount of the aerogel may be incorporated into the fluoroplastic component, to provide desired results. For example, the coating layer may be formed from about 0.1 weight percent to about 10 weight percent aerogel of the total weight of the surface coating, or from about 0.2 weight percent to about 5 weight percent aerogel of the total weight of the surface coating or from about 0.5 weight percent to about 2 weight percent of the total weight of the surface coating. The size of aerogel particles is from about 1 μm to about 100 μm, or about 3 μm to about 50 μm, or about 5 μm to 20 μm.

The surface coating has a surface free energy that is less than the surface energy of a fluoroplastic base layer that is used in the composite. This depends on the fluoroplastic. In embodiments fluoroplastics with aerogel particles dispersed therein produce a surface layer having a surface energy of less than 20 mN/m$^2$. In embodiments the surface free energy is less than 10 mN/m$^2$ for a superhydrophobic surface, or between 10 mN/m$^2$ and 2 mN/m$^2$, or is between 10 mN/m$^2$ and 5 mN/m$^2$, or is between 10 mN/m$^2$ and 7 mN/m$^2$.

Fluoroplastics such as Teflon and PFA are commonly processed from powders and then brought to melting temperature of from about 300° C. to about 380° C. to form a coherent coating. When aerogel and fluoroplastic particles are combined and brought to melting temperature, a fused fluororesin matrix is produced with embedded aerogel particles. The release layer incorporates aerogel fillers particles dispersed throughout a fluoroplastic matrix in ratios of 0.1 weight percent to 10 weight percent of the total solids in the release layer. In embodiments the aerogel amount was from 0.2 weight percent to 5 weight percent or from about 0.5 weight percent to about 2 weight percent of the total solids in the release layer.

The composition of fluoroplastic and aerogel is powder coated on a substrate to form a surface layer. During powder coating, the powder composition is electrostatically spray coated, electrostatic fluidized bed coated, electrostatic magnetic brush coated, or fluidized bed coated on a substrate in any suitable known manner.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Powder mixtures of silica aerogel particles and perfluoroalkoxy (PFA) polymer particles were combined with different amounts of SpectrAl™ 100 (95 m$^2$/g fumed alumina) and SpectrAl™ 51 (55 m$^2$/g fumed alumina), which are positive tribocharging powders from Cabot.

TABLE 1

| Sample ID | Aerogel weight percent | PFA weight percent | Fumed alumina weight percent |
|---|---|---|---|
| Control | 2.5 | 97.5 | 0 |
| 1 | 2.5 | 97.0 | 0.5 SpectrAl ™ 100 |
| 2 | 2.5 | 96.5 | 1.0 SpectrAl ™ 100 |
| 3 | 2.5 | 95.5 | 2.0 SpectrAl ™ 100 |
| 4 | 2.5 | 96.5 | 1.0 SpectrAl ™ 51 |
| 5 | 2.5 | 95.5 | 2.0 SpectrAl ™ 51 |

All samples in Table 1 were mixed in the Resodyn® Acoustic Mixer for 2 minutes at settings of 60 g acceleration, 100 percent intensity and at a resonant frequency of 61.2 Hz.

Figure 7:
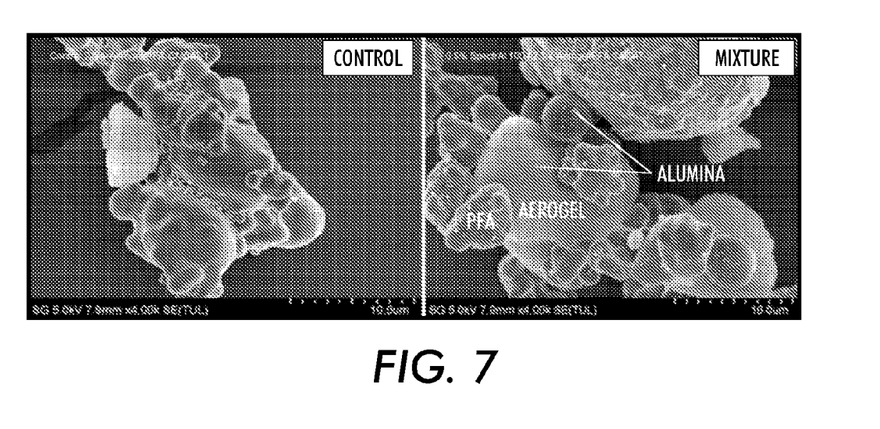
FIG. 7 are scanning electron microscopic images of PFA powder/aerogel particles control (left), and powder mixture containing PFA powder/aerogel particles/tribocharging particles (right).

The powder in each example was compacted following mixing. Scanning Electron Microscopic (SEM) analysis indicated that alumina particles are present on the surface of both PFA particles and aerogel particles (FIG. 7). There was a strong preference for alumina to adhere to the aerogel particle surface. An association between particles was noted during SEM analysis, observed as partial stacking and clustering of powder mixtures.

The powder mixtures in Table 1 were subsequently powder coated onto Olympia fuser rolls. Using a sectioning cover, two different samples were coated onto each roll. Film thicknesses after curing 330° C. for 20 minutes were 35 microns, and for each material, roll gloss was recorded at the center and a film was cut out for thickness SEM.

Initial gloss results indicate that gloss increases with the addition of alumina, then decreases as more alumina is added (Table 2). In all cases, the addition of alumina increased gloss from the value obtained from the control. SEM results confirmed that the control sample comprises a non-cohesive layer that contributes to the very low gloss. In comparison, samples 1, 2 and 3 display improved film cohesion, while maintaining a textured surface due to aerogel particles at the surface. This is the desirable case for matte printing without contamination issues. The introduction of SpectrAl powders results in improved film cohesion after curing, reflected in higher gloss values. At higher alumina powder incorporation, the surface becomes rougher and uneven, indicating that an optimized alumina loading is required for an even coating surface.

TABLE 2

Roll gloss values.

| Sample ID | Roll Gloss 75 |
|---|---|
| Control | 2.3 |
| 1 | 16.3 |
| 2 | 17.1 |
| 3 | 9 |
| 4 | 22.1 |
| 5 | 11.2 |

The disclosure described herein shows a powder system containing fluoroplastic powder, aerogel filler, and positive tribocharging powders added at about 0.01 weight percent to about 5 weight percent is suitable for powder coating. Further, addition of positive tribocharging powders enables dissimilar powders to associate. This allows for powder coating and a homogeneous release layer. The addition of positive tribocharging powders enables dissimilar powders to wet surfaces while curing together to form a cohesive release layer. A cured release layer of fluoroplastic powder, silica aerogel filler, and positive tribocharging powders is suitable for low gloss fusing applications. The positive tribocharging powder may be alumina powder.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A coating composition comprising fluorine containing particles, aerogel particles and positive tribocharging particles.

2. The coating composition of claim 1, wherein the fluorine containing particles comprise a polymer selected from the group consisting polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; and tetrapolymers of tetrafluoroethylene, vinylidene fluoride, hexafluoropropylene and a cure site monomer.

3. The coating composition of claim 1, wherein the positive tribocharging particles comprise a material selected from the group consisting of alumina, silica, zirconia and germania.

4. The coating composition of claim 1, wherein the positive tribocharging particles comprise fumed alumina particles having a surface area of from about 30 $m^2/g$ to about 400 $m^2/g$.

5. The coating composition of claim 1, wherein the positive tribocharging particles comprise a size of from about 5 nm to about 1 micron.

6. The coating composition of claim 1, wherein an amount of the positive tribocharging particles ranges from about 0.1 weight percent to about 5 weight percent of the total solids in the powder.

7. The coating composition of claim 1, wherein the coating composition further comprises fillers selected from the group consisting of carbon blacks, carbon nanotubes, graphite, graphene, metal oxides, doped metal oxides, polyanilines, polythiophenes, polyacetylene, poly(p-phenylene vinylene), poly(p-phenylene sulfide), polypyrroles, polyindole, polypyrene, polycarbazole, polyazulene, polyazepine, poly(fluorene), polynaphthalene, salts of organic sulfonic acid, ammonium or phosphonium salts, and mixtures thereof.

8. A method of making a fuser member, comprising:
obtaining a fuser member comprising a resilient layer disposed on a substrate;
spray coating a powder comprising a composition of fluorine containing particles, aerogel particles and positive tribocharging particles on the resilient layer to form a coated layer;
heating the coated layer to a temperature of from about 260° C. to about 380° C. to form a release layer.

9. The method of claim 8 wherein the fluorine containing particles comprise a material selected from the group consisting polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; tetrapolymers of tetrafluoroethylene, vinylidene fluoride, and hexafluoropropylene, and mixtures thereof.

10. The method of claim 8, wherein the positive tribocharging particles comprise a material selected from the group consisting of alumina, silica, zirconia and germania.

11. The method of claim 8, wherein the positive tribocharging particles comprise fumed alumina particles.

12. The method of claim 11, wherein the fumed alumina particles comprise a surface area of from about 30 $m^2/g$ to about 400 $m^2/g$.

13. The method of claim 8, wherein an amount of positive tribocharging particles ranges from about 0.1 weight percent to about 5 weight percent of the total solids in the composition.

14. The method of claim 8 wherein the composition further comprises fillers selected from the group consisting of carbon blacks, carbon nanotubes, graphite, graphene, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, ammonium or phosphonium salts, and mixtures thereof.

15. The method of claim 8, wherein the release layer comprises a thickness of from about 5 microns to about 250 microns.

16. The method of claim 8 wherein the positive tribocharging particles comprise a size of from about 5 nm to about 1 micron.

17. The method of claim 8, wherein the aerogel particles comprise a material selected from the group consisting of silica, carbon, alumina, titania and zirconia.

18. The method of claim 8, wherein the aerogel particles comprise a surface area of from about 400 $m^2/g$ to about 1200 $m^2/g$.

19. The method of claim 8, wherein the aerogel particles comprise a particle size of from about 1 μm to about 100 μm.

20. A fuser member comprising:
a substrate; and
an outer layer disposed on the substrate, wherein the outer layer comprises a fluorine containing matrix having dispersed therein aerogel particles, wherein the aerogel particles comprise from about 0.1 weight percent to about 10 weight percent, and fumed alumina particles, wherein the fumed alumina particles comprise from 0.1 weight percent to about 5 weight percent of the outer layer and wherein the fuser member has a G75 surface gloss ranging from about 5 ggu to about 70 ggu.

* * * * *